United States Patent
Tolstsikau et al.

(10) Patent No.: US 11,681,554 B2
(45) Date of Patent: Jun. 20, 2023

(54) LOGICAL ADDRESS DISTRIBUTION IN MULTICORE MEMORY SYSTEM

(71) Applicant: SK hynix Inc., Gyeonggi-do (KR)

(72) Inventors: Aliaksei Tolstsikau, Minsk (BY); Maksim Skurydzin, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 558 days.

(21) Appl. No.: 16/676,102

(22) Filed: Nov. 6, 2019

(65) Prior Publication Data

US 2020/0142744 A1 May 7, 2020

Related U.S. Application Data

(60) Provisional application No. 62/756,137, filed on Nov. 6, 2018.

(51) Int. Cl.
*G06F 9/50* (2006.01)
*G06F 12/02* (2006.01)
*G06F 9/30* (2018.01)

(52) U.S. Cl.
CPC ........ *G06F 9/5016* (2013.01); *G06F 9/30029* (2013.01); *G06F 9/5077* (2013.01); *G06F 12/0246* (2013.01); *G06F 2212/7201* (2013.01)

(58) Field of Classification Search
CPC .. G06F 9/5016; G06F 9/30029; G06F 9/5077; G06F 12/0246; G06F 2212/7201
See application file for complete search history.

(56) References Cited

U.S. PATENT DOCUMENTS

| | | | | |
|---|---|---|---|---|
| 6,731,599 | B1* | 5/2004 | Hunter | H04L 45/24 718/105 |
| 2004/0225859 | A1* | 11/2004 | Lane | G06F 12/0864 711/202 |
| 2005/0015567 | A1* | 1/2005 | Zohar | G06F 12/0873 711/E12.019 |
| 2009/0006876 | A1* | 1/2009 | Fukatani | G06F 3/0625 713/320 |
| 2012/0036244 | A1* | 2/2012 | Ramachandra | H04L 61/50 709/223 |
| 2014/0019579 | A1* | 1/2014 | Motwani | H04L 67/1097 709/216 |
| 2015/0089168 | A1* | 3/2015 | Kalyanasundharam | G06F 12/0607 711/157 |
| 2015/0221349 | A1 | 8/2015 | Jeon et al. | |
| 2016/0154733 | A1* | 6/2016 | Lim | G06F 11/1048 711/103 |
| 2017/0075816 | A1* | 3/2017 | Okada | G06F 21/79 |
| 2018/0107619 | A1 | 4/2018 | Singh et al. | |
| 2018/0189187 | A1* | 7/2018 | Cheung | G06F 12/1009 |
| 2020/0248254 | A1* | 8/2020 | Hayes | B01J 19/0046 |

* cited by examiner

*Primary Examiner* — Nanci N Wong
(74) *Attorney, Agent, or Firm* — IP &T Group LLP

(57) ABSTRACT

A workload distribution scheme is provided for a multicore memory system. The memory system includes a memory device including blocks and a controller including cores. The controller receives multiple logical addresses from a host, determines a range of logical addresses among the multiple logical addresses to be allocated for the cores, and distributes multiple subsets of the logical addresses in the range to the cores, based on an operation of modulo and shuffling on the multiple logical addresses.

14 Claims, 14 Drawing Sheets

FIG. 11

```
// LBA (LBA_local) → FTL_index 0 (0) → 0
1 (0) → 1
2 (1) → 1
3 (1) → 0
4 (2) → 1
5 (2) → 0
6 (3) → 0
7 (3) → 1
8 (4) → 1
9 (4) → 0
10 (5) → 0
11 (5) → 1
12 (6) → 0
13 (6) → 1
14 (7) → 1
15 (7) → 0
16 (8) → 1
17 (8) → 0
18 (9) → 0
19 (9) → 1
20 (10) → 0
21 (10) → 1
22 (11) → 1
23 (11) → 0
24 (12) → 0
25 (12) → 1
26 (13) → 1
27 (13) → 0
28 (14) → 1
29 (14) → 0
30 (15) → 0
31 (15) → 1
32 (16) → 1
33 (16) → 0
34 (17) → 0
35 (17) → 1
36 (18) → 0
37 (18) → 1
38 (19) → 1
39 (19) → 0
  ⁞
```

FIG. 13

| | | | | | |
|---|---|---|---|---|---|
| 0, 2, 4, 6, ... | 1, 3, 5, 7, ... | S1 | 0, 3, 5, 6, ... | 1, 2, 4, 7, ... |
| 0, 2, 4, 6, 8, 10, 12, 14, ... | empty | S2 | 0, 6, 10, 12, ... | 2, 4, 8, 14, ... |
| 0, 4, 8, 12, 16, 20, 24, 28, ... | empty | S3 | 0, 12, 20, 24, ... | 4, 8, 16, 28, ... |

1300A        1300B

LOGICAL ADDRESS DISTRIBUTION IN MULTICORE MEMORY SYSTEM

CROSS-REFERENCE TO RELATED APPLICATION

This application claims the benefit of U.S. Provisional Application No. 62/756,137, filed on Nov. 6, 2018, the entire contents of which are incorporated herein by reference.

BACKGROUND

1. Field

Embodiments of the present disclosure relate to an address distribution scheme for a multicore memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs).

Memory systems may include multiple cores. Workload may be distributed between the cores.

SUMMARY

Aspects of the present invention are directed to a scheme for distributing workload between multiple cores in a multicore memory system.

In one aspect, the multicore memory system includes a memory device including a plurality of blocks, each block having a physical address corresponding to one of a plurality of logical addresses; and a controller including a plurality of cores for controlling the memory device to perform an operation on at least one of the plurality of blocks. The controller receives the plurality of logical addresses from a host; determines a range of logical addresses among the plurality of logical addresses to be allocated for the plurality of cores, the range including multiple subsets; and distributes the subsets to the plurality of cores, based on an operation of modulo and shuffling on the plurality of logical addresses.

In another aspect, a method for operating a memory system is provided. The memory system includes a memory device including a plurality of blocks, each block having a physical address corresponding to one of a plurality of logical addresses and a controller including a plurality of cores for controlling the memory device to perform an operation on at least one of the plurality of blocks. The method includes: receiving the plurality of logical addresses from a host; determining a range of logical addresses among the plurality of logical addresses to be allocated for the plurality of cores, the range including multiple subsets; and distributing the subsets to the plurality of cores, based on an operation of modulo and shuffling on the plurality of logical addresses.

Additional aspects of the present invention will become apparent from the following description.

BRIEF DESCRIPTION OF THE DRAWINGS

FIG. 11 is a diagram illustrating an example of a workload distribution scheme in accordance with an embodiment of the present invention.

FIG. 13 is a diagram illustrating a comparative result of workload distribution schemes in accordance with embodiments of the present invention.

DETAILED DESCRIPTION

Figure 1:
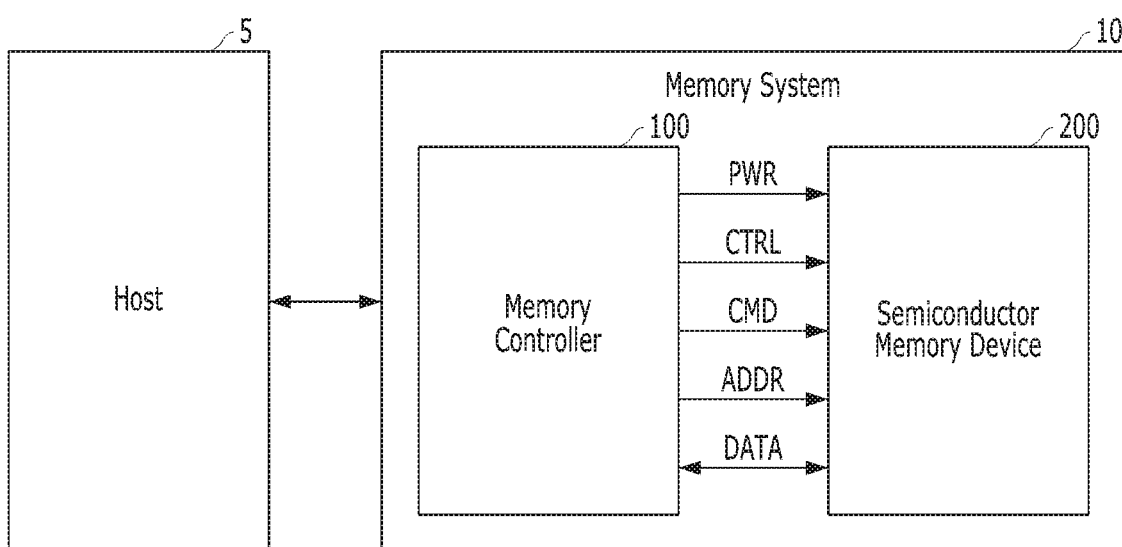
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200. For simplicity, memory controller 100 and semiconductor memory device 200 may sometimes be referred to below as controller 100 and memory device 200, respectively.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
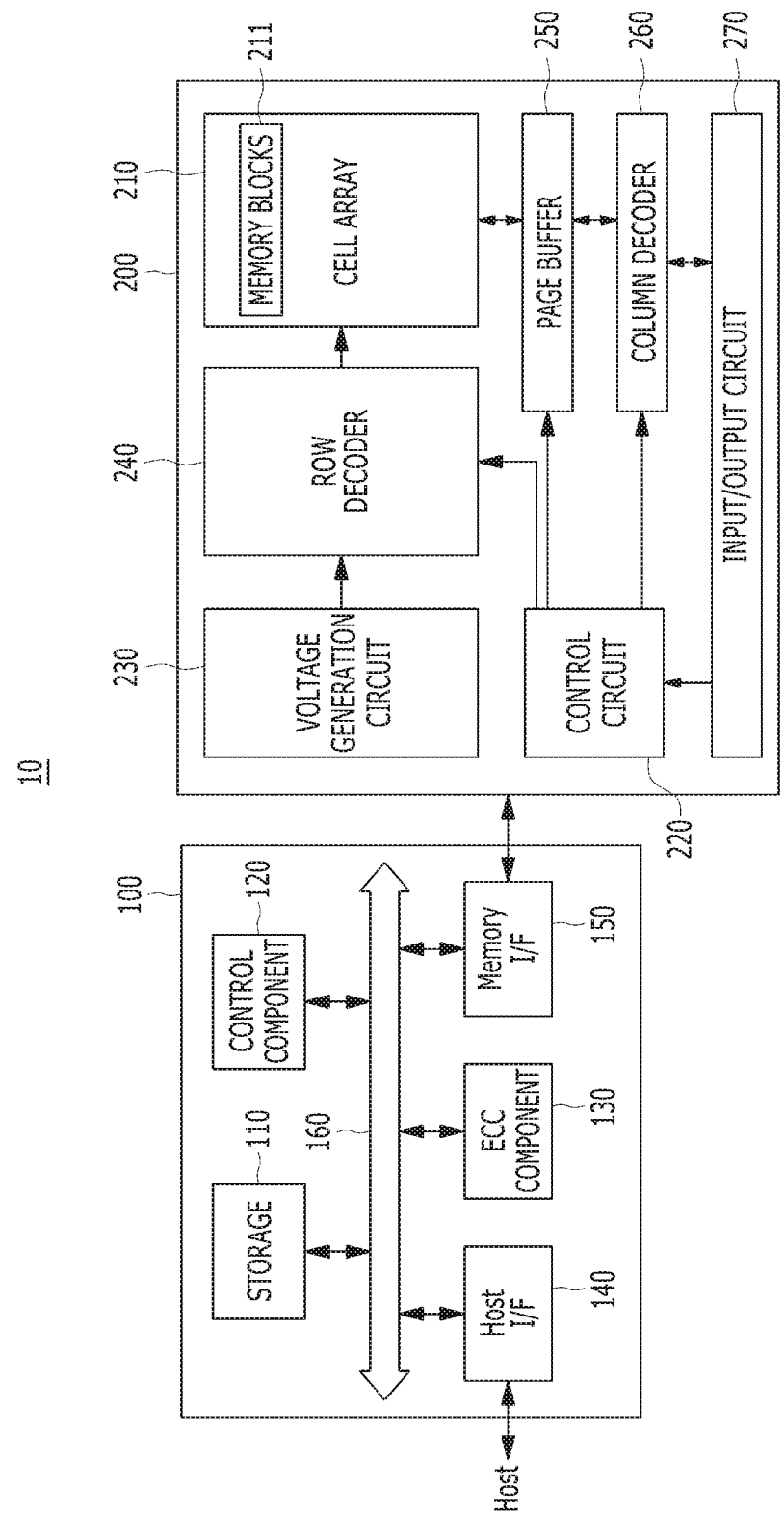
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), a non-volatile memory express (NVMe) and a universal flash storage (UFS).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
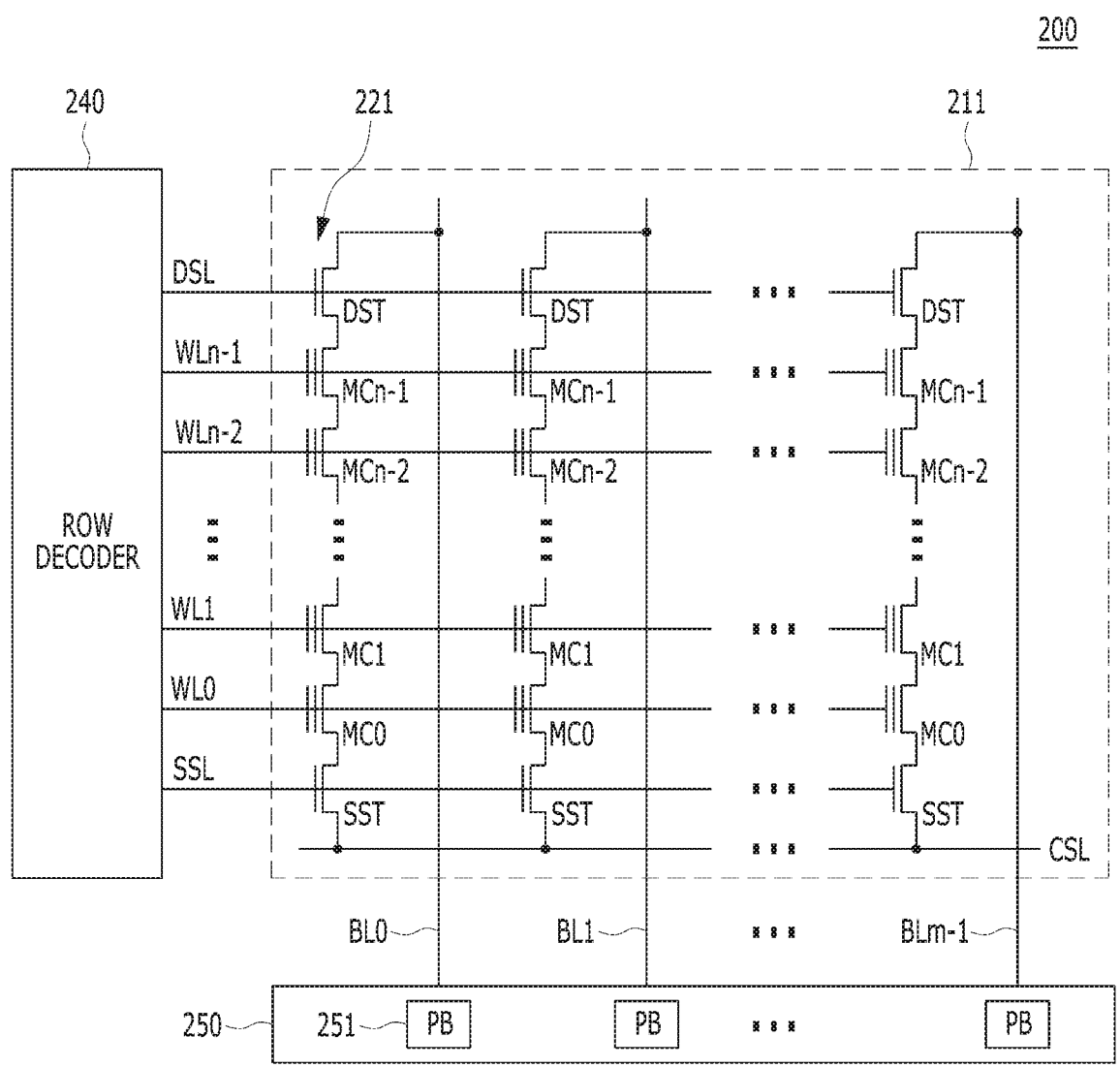
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

A memory device such as a flash memory (e.g., NAND flash memory) may include a plurality of memory blocks (e.g., hundreds to thousands of memory blocks). Each block typically may include a plurality of wordlines (e.g., hundreds of wordlines). Each cell coupled to each wordline may include multiple logical pages. The memory device may include a plurality of memory cells and store multiple bits per cell by modulating the cell into different states or program voltage (PV) levels through a programming operation.

Figure 4:
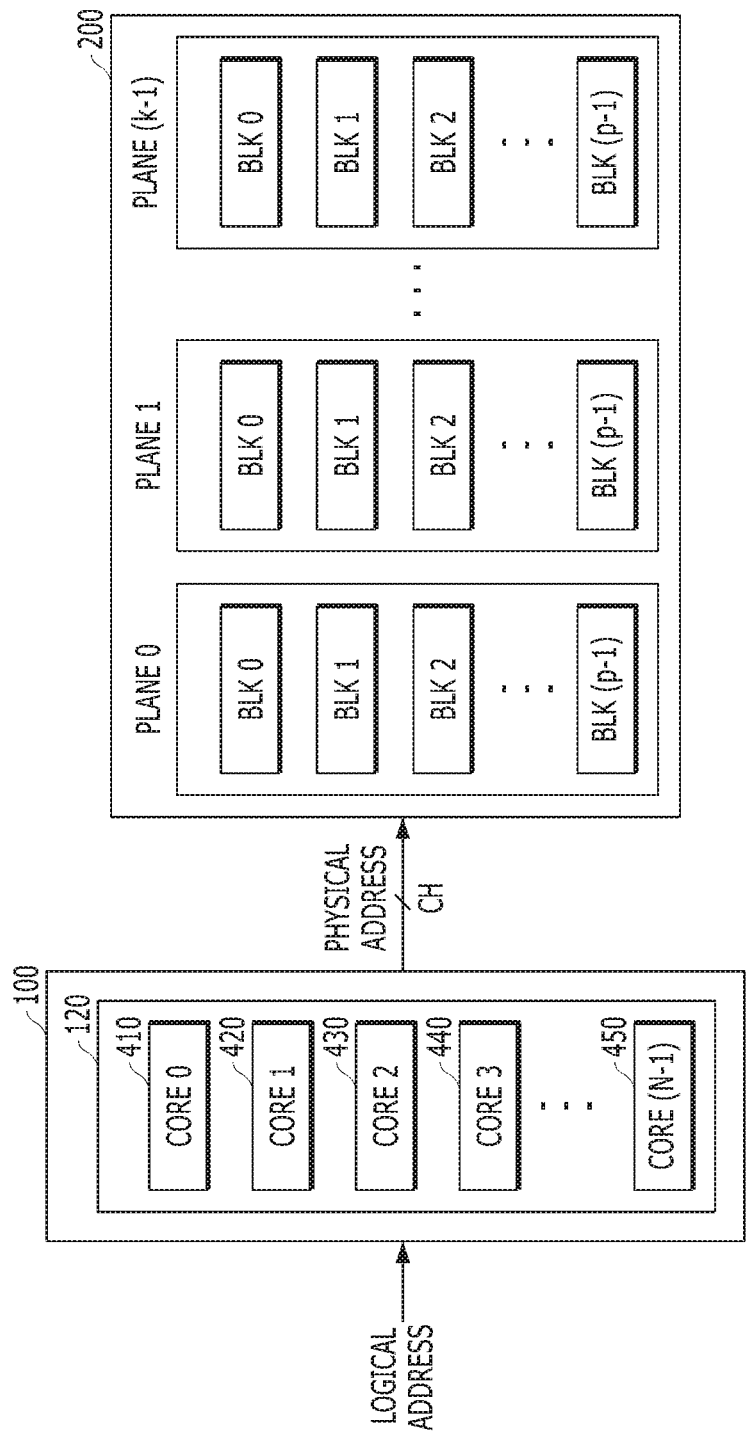
FIG. 4 is a diagram illustrating a multicore memory system in accordance with an embodiment of the present invention.

FIG. 4 is a diagram illustrating a multicore memory system in accordance with an embodiment of the present invention.

Referring to FIG. 4, the multicore memory system may include a controller 100 and a memory device 200. The controller 100 may include a control component 120. The control component 120 may include a plurality of cores 410 to 450. For example, the control component 120 may include N cores CORE0 to CORE(N-1).

The memory device 200 may include a plurality of planes PLANE0 to PLANE(k-1). Each of the plurality of planes may include a plurality of blocks BLK0 to BLK(p-1). Each of the plurality of blocks include a plurality of pages. Each of the plurality of pages may have having a physical address. In other words, each of the plurality of blocks may have a region having a physical address corresponding to one of the plurality of logical addresses.

The controller 100 may control the memory device 200 to perform an operation (e.g., a write, read or erase operation) on at least one block in the memory device 200. For this operation, the controller 100 may receive a logical address, translate the logical address into a physical address and provide the physical address to the memory device 200. The logical address and the physical address may be associated with the operation. The logical address may be received from a host 5 of FIG. 1. The physical address may be provided to a corresponding block of a corresponding plane in the memory device 200 through a channel CH. As such, the controller 100 may include multiple cores and the memory system may have a multiple core architecture.

Figure 5:
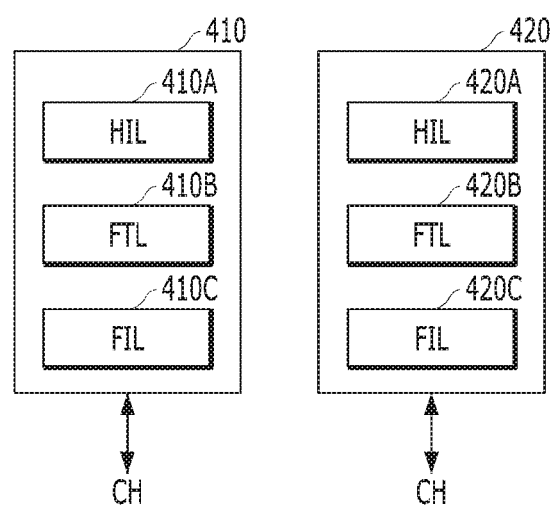
FIG. 5 is a diagram illustrating cores in accordance with an embodiment of the present invention.

FIG. 5 is a diagram illustrating cores in accordance with an embodiment of the present invention. By way of example, FIG. 5 illustrates cores 410, 420 among the plurality of cores 410 to 450 in FIG. 4. The present invention is not limited to any particular number of cores; any suitable number of cores may be included in the controller 100.

Referring to FIG. 5, the core 410 may include firmware such as a host interface layer (HIL) 410A, a flash translation layer (FTL) 410B and a flash interface layer (FIL) 410C. The core 420 may include a host interface layer (HIL) 420A, a flash translation layer (FTL) 420B and a flash interface layer (FIL) 420C.

Each host interface layer may control an operation of the host interface 140 in FIG. 2. For example, the host interface layer may receive commands (or requests), data and/or logical addresses (i.e., logical block addresses (LBA)) from the host 5, which are associated with the memory device 200. Further, the host interface layer may forward the commands, data and/or addresses to the flash translation layer.

Each flash translation layer may control an operation of the control component 120 in FIG. 2. For example, the flash translation layer may receive logical addresses from the host interface layer and translate the logical addresses into physical addresses. Further, the flash translation layer may receive commands from the host interface layer and translate the commands into operation requests.

Each flash interface layer may control an operation of the memory interface 150 in FIG. 2. For example, the flash interface layer may receive physical addresses and operation requests from the flash translation layer and the physical addresses and the operation requests to the memory device 200 through the memory interface 150.

Figure 6A:
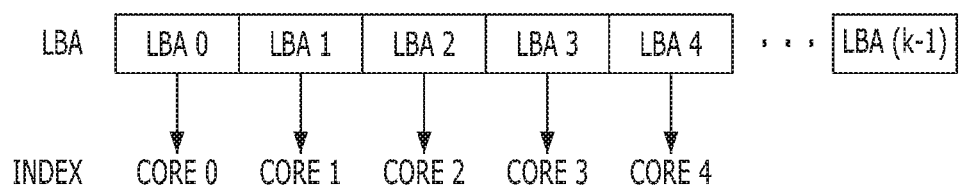
FIGS. 6A and 6B are diagrams illustrating workload distribution schemes in accordance with an embodiment of the present invention.
Figure 6B:
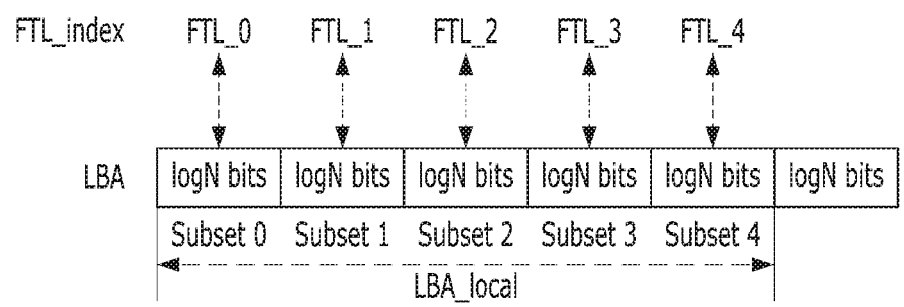

FIGS. 6A and 6B are diagrams illustrating workload distribution schemes in accordance with an embodiment of the present invention. By way of example, the workload distribution schemes may be performed by a host interface layer (HIL) of a selected core (e.g., CORE0 410) among the plurality of cores 410 to 450 in FIG. 4.

Referring to FIG. 6A, the selected core may receive logical addresses or logical block addresses (LBAs) LBA0 to LBA(k-1). Further, the selected core, e.g., CORE 0 410, may distribute workload corresponding to a range of logical block addresses LBA0 to LBA4 to cores CORE 0 to CORE 4. The range of logical block addresses LBA0 to LBA4 are logical block addresses to be allocated for the plurality of cores, among the logical block addresses LBA0 to LBA(k-1). For example, the selected core may distribute a logical block address LBA0 to a core 0, a logical block address LBA1 to a core 1, a logical block address LBA2 to a core 2, a logical block address LBA3 to a core 3 and a logical block address LBA4 to a core 4. The selected core may determine core indices for distributing workload corresponding to the range of logical block addresses LBA0 to LBA4.

Referring to FIG. 6B, a host interface layer of the selected core may receive logical addresses or logical block addresses (LBAs). Further, such host interface layer may determine a range LBA_local of logical addresses among the received logical addresses, which is to be allocated for the plurality of cores. The range may include multiple subsets. For example, each subset may include log N bits (where N is the total number of cores) and correspond to a respective one of the plurality of cores.

Furthermore, the host interface layer of the selected core may distribute each subset of LBAs to a respective one of the plurality of cores. For example, the host interface layer may distribute a subset 0 to a flash translation layer of a core 0 (FTL_0), a subset 1 to a flash translation layer of a core 1 (FTL_1), a subset 2 to a flash translation layer of a core 2 (FTL_2), a subset 3 to a flash translation layer of a core 3 (FTL_3), and a subset 4 to a flash translation layer of a core 4 (FTL_4). The host interface layer of the selected core may determine core indices for distributing each subset of the range of logical block addresses.

Figure 7:
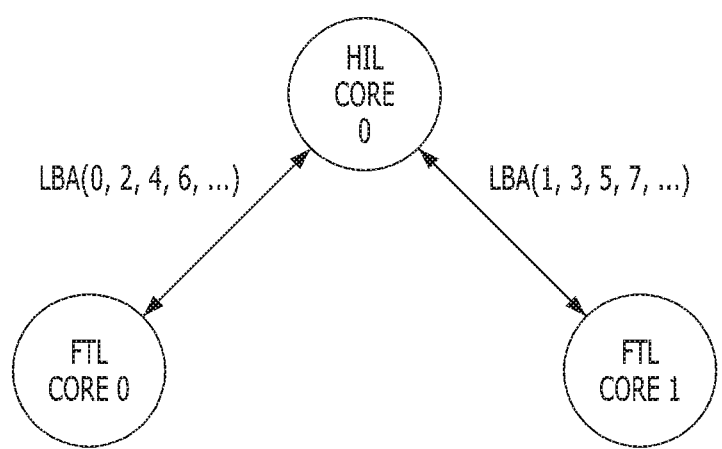
FIG. 7 is a diagram illustrating an example of a typical workload distribution scheme.

FIG. 7 is a diagram illustrating an example of a typical workload distribution scheme (i.e., a logical block address (LBA) distribution scheme). By way of example, the workload distribution scheme may be performed by a host interface layer (HIL) of a selected core CORE0 among two cores CORE0, CORE1.

Referring to FIG. 7, the host interface layer of a selected core CORE0 may receive logical addresses including LBA0 to LBA7. The host interface layer of CORE0 may distribute even logical addresses LBA(0, 2, 4, 6, . . . ) to a flash translation layer of its own core CORE0, and may distribute odd logical addresses LBA(1, 3, 5, 7, . . . ) to a flash translation layer of an odd core CORE1. In other words, logical addresses may be distributed between cores in an odd-even distribution scheme.

Figure 8:
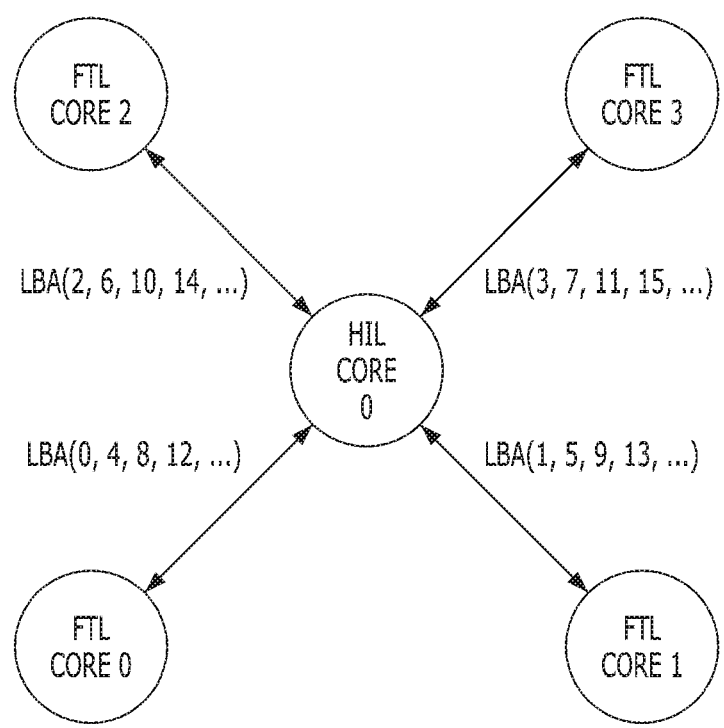
FIG. 8 is a diagram illustrating another example of a typical workload distribution scheme.

FIG. 8 is a diagram illustrating another example of a typical workload distribution scheme (i.e., a logical block address (LBA) distribution scheme). By way of example, the workload distribution scheme may be performed by a host interface layer (HIL) of a selected core CORE0 among four cores CORE0 to CORE3.

Referring to FIG. 8, the host interface layer of a selected core CORE0 may receive logical addresses including LBA0 to LBA15. The host interface layer may distribute the received logical addresses to all of the cores including its own core CORE0 in a modulo-based scheme (i.e., modulo 4).

The host interface layer of CORE0 may distribute logical addresses LBA(0, 4, 8, 12, . . . ) to a flash translation layer of its own core CORE0. The host interface layer may distribute logical addresses LBA(1, 5, 9, 13, . . . ) to a flash translation layer of the core CORE1. The host interface layer may distribute logical addresses LBA(2, 6, 10, 14, . . . ) to a flash translation layer of the core CORE2 among the cores CORE0 to CORE3. The host interface layer may distribute logical addresses LBA(3, 7, 11, 15, . . . ) to a flash translation layer of the core CORE3.

In accordance with a workload distribution scheme of FIG. 8, LBA_local and FTL_index may be determined as shown in List1.

List1:
FTL_index=LBA % N
LBA_local=LBA/N

In List1, N represents the number of cores, % represents a modulo operation, LBA_local represents a range of logical addresses among the received logical addresses, which is to be allocated for the cores, and FTL_index represents indices indicating cores or flash translation layers thereof, to which respective subsets of logical addresses in the range are distributed.

For example, the number of cores N is 2. In this case, FTL_index=LBA % 2, and LBA_local=LBA/2. For another example, the number of cores N is 4 as shown in FIG. 8. In this case, FTL_index=LBA % 4, and LBA_local=LBA/4.

The workload distribution schemes of FIGS. 7 and 8 may significantly simplify FTL design since all FTL cores may be fully independent of each other. Further, the workload distribution schemes may make it scalable since removing or adding more cores may be transparent for each FTL. Furthermore, in accordance with the workload distribution schemes, any sequential read/write of several blocks may be parallelized.

Since the workload distribution schemes above are static in terms of the LBA distribution, no load balancing may be possible. Further, since only one core processes commands, workload (i.e., reading/writing LBAs) performed in n steps for n cores may lead to a significant performance drop. Further, when traffic is random enough (e.g., random write 4 K workload or random 12 K workload on 8 K-aligned addresses), uneven workload may lead to a premature failure of the whole device (i.e., a memory system) such as a solid state drive (SSD) and even a small disproportion may have a significant impact. For example, just a few percent skew may result in failure months before expected device failure.

Accordingly, it is desirable to provide workload distribution schemes for load balancing without significant performance drop. The workload distribution schemes are to preserve all advantages of modulo-based workload distribution scheme and to add some internal shuffling of workload between cores. In other words, the workload distribution schemes are based on a modulo and shuffling scheme.

Figure 9:
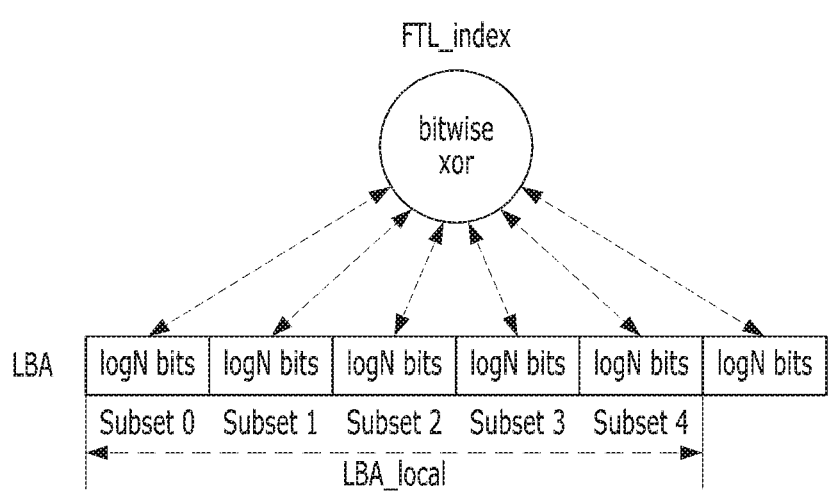
FIG. 9 is a diagram illustrating a workload distribution scheme in accordance with an embodiment of the present invention.

FIG. 9 is a diagram illustrating a workload distribution scheme (i.e., a FTL_index distribution scheme) in accordance with an embodiment of the present invention. By way of example, the workload distribution scheme may be performed by a host interface layer (HIL) of a selected core (e.g., CORE0 410) among all of the cores in the system.

Referring to FIG. 9, the host interface layer of the selected core may receive a plurality of logical addresses (i.e., LBAs). Further, the host interface layer may distribute each logical address to one of the cores. In other words, the host interface layer may determine FTL_index. Each FTL_index indicates a core or corresponding a flash translation layer of that core. The individual indices, e.g., FTL_A, within FTL_index correspond to respective subsets of logical addresses in the range LBA_local. Each subset may include log N bits (where N is the number of cores and a power of 2) and correspond to one of the cores.

In an embodiment the host interface layer may perform the distribution operation by performing a bitwise exclusive OR (XOR) operation on bits of the plurality of logical addresses. Thus, the host interface layer may distribute a first subset in the range to a core of the plurality of cores corresponding to the bitwise XOR operation. This distribution operation will be described in below with reference to List2 and List3.

In another embodiment, the host interface layer may distribute each logical address to one of the cores based on a Thue-Morse sequence. A Thue-Morse sequence may be defined as the binary sequence (an infinite sequence of 0s and 1s) obtained by starting with 0 and successively appending the Boolean complement of the sequence obtained thus far. Another definition is the i-th element equal to the number of 1s in the binary notation of number i modulo 2. Examples of this distribution operation will be described in below with reference to FIGS. 10 and 11.

Figure 10:
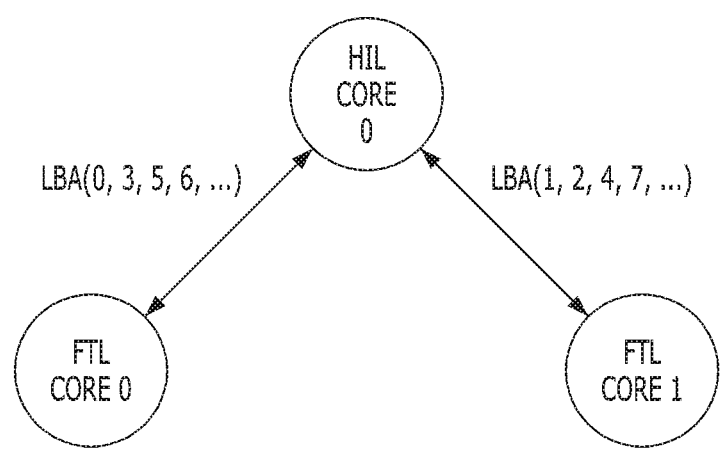
FIG. 10 is a diagram illustrating an example of a workload distribution scheme of FIG. 9.

FIG. 10 is a diagram illustrating an example of a workload distribution scheme of FIG. 9.

Referring to FIG. 10, the host interface layer of the core CORE0 may receive a plurality of logical addresses including LBA0 to LBA38. Further, the host interface layer may distribute each logical address to one of the two cores CORE0, CORE1 based on the Thue-Morse sequence.

The host interface layer of the core CORE0 may distribute logical addresses LBA(0, 3, 5, 6, . . . ) to a flash translation layer FTL of the core CORE0 among the two cores CORE0, CORE1. Further, the host interface layer of the core CORE0 may distribute logical addresses LBA(1, 2, 4, 7, . . . ) to a flash translation layer FTL of the core CORE1 among the two cores CORE0, CORE1.

FIG. 11 is a diagram illustrating an example of a workload distribution scheme in accordance with an embodiment of the present invention. By way of example, the workload distribution scheme may be performed by a host interface layer (HIL) of a selected core (e.g., CORE0 410) among the plurality of cores 410 to 450 in FIG. 4.

Referring to FIG. 11, the host interface layer of the selected core may determine that LBA_local is to be allocated for the cores. LBA_local represents a range of logical addresses among the received logical addresses LBAs. Further, the host interface layer may determine FTL_index. Each FTL_index indicates a core or corresponding a flash translation layer of that core.

In a range of LBA_local 0 to LBA local 3, the host interface layer of CORE0 may distribute logical addresses LBA(0, 3, 5, 6) to a flash translation layer FTL of its own core CORE0 and distribute logical addresses LBA(1, 2, 4, 7) to a flash translation layer FTL of CORE1.

In a range of LBA_local 4 to LBA_local 7, the host interface layer of CORE0 may distribute logical addresses LBA(9, 10, 12, 15) to a flash translation layer FTL of CORE0 and distribute logical addresses LBA(8, 11, 13, 14) to a flash translation layer FTL of CORE1.

In a range of LBA_local 8 to LBA_local 11, the host interface layer of CORE0 may distribute logical addresses LBA(17, 18, 20, 23) to a flash translation layer FTL of CORE0 and distribute logical addresses LBA(16, 19, 21, 22) to a flash translation layer FTL of CORE1.

In a range of LBA_local 12 to LBA_local 15, the host interface layer of CORE0 may distribute logical addresses LBA(24, 27, 29, 30) to a flash translation layer FTL of CORE0 and distribute logical addresses LBA(25, 26, 28, 31) to a flash translation layer FTL of CORE1.

In a range of LBA_local 16 to LBA_local 19, the host interface layer of CORE0 may distribute logical addresses LBA(33, 34, 36, 39) to a flash translation layer FTL of CORE0 and distribute logical addresses LBA(32, 35, 37, 38) to a flash translation layer FTL of CORE1.

In some embodiments, LBA_local and FTL_index may be determined as shown in List2.

List2:
FTL_index=bitwise_xor(split_into_binary_blocks(LBA, length=log N))
LBA_local=LBA/N In List2, N represents the number of cores, LBA_local represents a range of logical addresses among the received logical addresses, which are to be allocated for the cores, and FTL_index represents an index indicating a core or a flash translation layer of the core, which is distributed to each subset of logical address in the range.

In some embodiments, the host interface layer of the selected core may determine the range of logical addresses LBA_local based on total logical addresses LBA and the number of cores N, i.e., by dividing LBA by N.

In some embodiments, the host interface layer of the selected core may divide total logical addresses LBA into a plurality of subsets in order to determine FTL_index. Each subset may have a length of log N bits. Further, a bitwise exclusive OR operation (i.e., bitwise_xor or bitwise_XOR operation) may be performed on the plurality of subsets. In other words, the bitwise_xor operation may be performed on corresponding bits of subsets Subset0 to Subset4. For example, when each subset includes 2 bits, the bitwise_xor operation may be performed on most significant bits (MSBs) of subsets Subset0 to Subset4, and the bitwise_xor operation may be performed on least significant bits (LSBs) of subsets Subset0 to Subset4.

An example of determining LBA_local and FTL_index is shown in List3.

List3:
LBA is 0x03A4=0b0000'0011'1010'0100 and N is 0x04=0b100, then LBA_local=LBA N=0b0000'0000'1110'1001=0x00E9 and FTL_index=bitwise_xor([0b00, 0b00, 0b00, 0b11, 0b10, 0b10, 0b01, 0b00])=0b10.

In List3, "0x" represents that the following number is a hexadecimal number and "0b" represents that the following number is a binary number. For example, "0x03A4" represents that LBA is "03A4" in a hexadecimal number, and "0b100" represents that N is "100" in a binary number. Further, the symbol " ' " in LBA "0b0000'0011'1010'0100" represents that 4 bits (e.g., 0100) in a binary corresponds to 1 bit (e.g., 4) in a hexadecimal.

When LBA is 0x03A4=0b0000'0011'1010'0100 and N is 0x04=0b100, LBA_local may be determined by calculating LBA/N=0b0000'0000'1110'1001=0x00E9.

FTL_index may be determined by a bitwise exclusive OR operation (i.e., bitwise_xor or bitwise_XOR operation) on the plurality logical addresses LBA. The plurality logical addresses LBA may include subsets of "0000'0011'1010'0100". Since Subset0 has a value of 00, Subset1 has a value of 00, Subset2 has a value of 00, Subset3 has a value of 11, Subset4 has a value of 10, Subset5 has a value of 10, Subset6 has a value of 01, and Subset7 has a value of 00, FTL_index is determined by the operation of bitwise_xor([0b00, 0b00, 0b00, 0b11, 0b10, 0b10, 0b01, 0b00])=0b10.

After the range of logical addresses is determined and each subset of multiple subsets in the range is distributed to each of the plurality of cores, the selected core may perform an operation (e.g., a read, write or erase operation) on at least one block among a plurality of blocks in the memory device 200 through a channel. The at least one block may have physical addresses corresponding to the range the plurality of cores.

Figure 12:
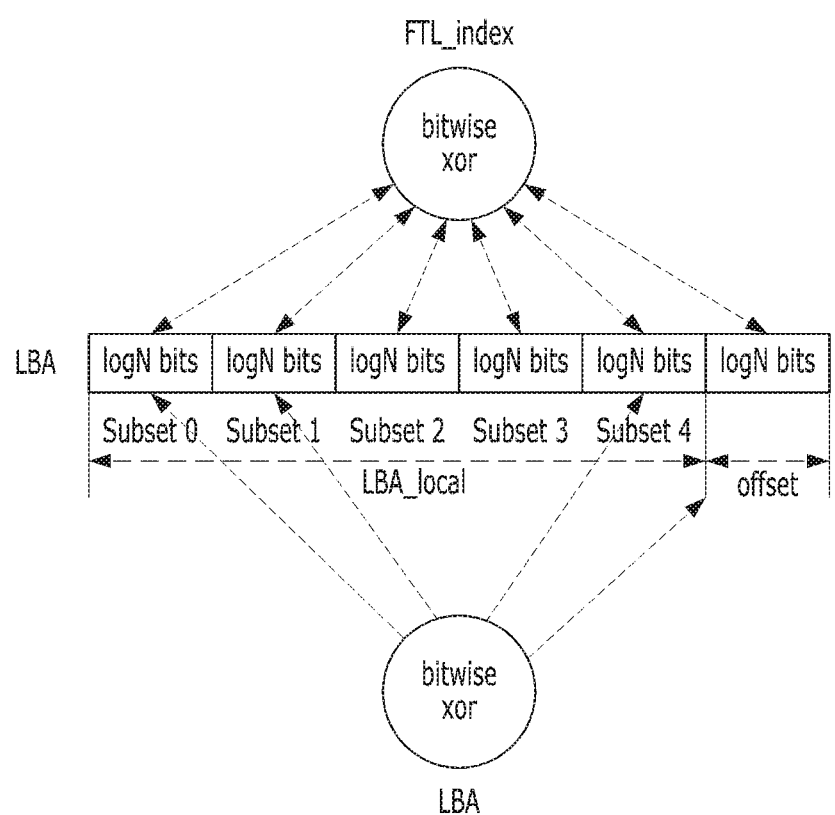
FIG. 12 is a diagram illustrating a method of calculating original logical addresses in accordance with an embodiment of the present invention.

FIG. 12 is a diagram illustrating a method of calculating original logical addresses in accordance with an embodiment of the present invention.

Referring to FIG. 12, the original logical addresses LBA may be calculated from LBA_local and FTL_index as shown in List4.

List4:
LBA=bitwise_xor(split_into_binary_blocks(LBA_local, length=log N)+[FTL_index])+LBA_local*N In List4, first, a bitwise XOR operation may be performed on subsets of LBA_local, each subset corresponding to log N bits. Second, an XOR operation may be performed on the result of the bitwise XOR operation and FTL_index. Third, a value of LBA_local is multiplied by the number of cores N. Finally, the result of XOR operation and the multiplication result LBA_local*N are added to calculate the original logical addresses LBA.

A calculation example of the original logical addresses LBA is shown in List5.

List5:
LBA_local is 0x00E9=0b0000'0000'1110'1001 and
FTL_index is 0b10,
then offset=bitwise_xor([0b00, 0b00, 0b00, 0b00, 0b11, 0b10, 0b10, 0b01]+[0b10])=0b00 and
LBA=0b0000'0000'1110'1001*0b100+ 0b00=0b0000'0011'1010' 0100=0x03A4

In List5, offset corresponds to a difference between the original logical addresses LBA and LBA_local. Since FTL_index and LBA_local are known values, offset may be calculated. When FTL_index is 0b10 and LBA_local is 0x00E9=0b0000'0000'1110'1001, the offset may be calculated through Equation in List5. When offset is calculated, the original logical addresses LBA may be calculated based on the offset, LBA_local and the number of cores N.

As described above, embodiments may calculate LBA_local and FTL_index simply and fast in a modulo and shuffling scheme. Further, embodiments may calculate the original logical addresses LBA from LBA_local and FTL_index. Further, embodiments may split the sequential range of N LBAs between N cores if first LBA in the range is a multiple of N. All LBAs in this range may map into the same LBA_local for different indices in the FTL_index such that only last log N bits in the LBAs differ. Furthermore, the policy of distribution between cores may change for different ranges. After a range change, the LBA_local changes, therefore the permutation of FTL_index for next range differs from the previous one.

FIG. 13 is a diagram illustrating a comparative result of workload distribution schemes in accordance with embodiments of the present invention.

Referring to FIG. 13, 1300A represents a modulo-based workload distribution scheme in FIG. 8 and List1, whereas 1300B represents a workload distribution scheme based on modulo and shuffling in FIG. 11 and List2. By way of example, the workload distribution schemes may be performed by a host interface layer (HIL) of a selected core (e.g., CORE0 410) among the two cores CORE0 and CORE1 in FIG. 4. Further, the sequences of LBA S1={0, 1, 2, 3, 4, 5, 6, 7, . . . }, S2={0, 2, 4, 6, 8, 10, 12, 14, . . . }, S4={0, 4, 8, 12, 16, 20, 24, 28, . . . } are considered. The scheme 1300A is stuck on sequences S2 and S4 while the scheme 1300B processes sequences without getting stuck. In other words, the scheme 1300B has an advantage in terms of load balancing, compared with the scheme 1300A.

Additionally, some properties from the workload distribution schemes may be checked. Two properties such as the worst FTL share and the maximum number of consecutive LBAs processed by some FTL may be analysed. The worst FTL share may be the largest percentage of LBAs from the sequence of LBAs processed by one FTL. The maximum number of consecutive LBAs processed by a particular FTL may be the length of the largest range of LBAs with the same value of FTL_index.

As for a case that N is 4, d is 2, length is 10 and LBA=[0, 2, 4, 6, 8, 10, 12, 14, 16, 18], two properties of the schemes 1300A and 1300B may be shown in List6.

List6:
Scheme 1300A FLT_0=[0, 4, 8, 12, 16], FTL_1=[ ], FTL_2=[2, 6, 10, 14, 18], FTL_3=[ ].
Scheme 1300B e FTL . . . 0=[0, 10], FTL . . . 1=[4, 14, 16], FTL . . . 2=[2, 8, 18], FTL_3=[6, 12].
The worst FTL share is 5/10=0.5 for the scheme 1300A and 3/10=0.3 for the scheme 1300B.
The maximum number (M) of consecutive LBAs processed by some FTL is 1 for scheme 1300A, and is 2 for scheme 13003.

As for other cases, two properties of the schemes 1300A and 13003 may be shown in Table1 and Table2. Table1 represents the worst FTL share (WS) and Table2 represents the maximum number (M) of consecutive LBAs processed by some FTL. The other cases may provide Table1 and Table2 to check some properties from several arithmetic sequences. 1000 tests may run with the difference between consecutive elements d from 1 to 1000 and length 10000.

TABLE 1

| Cores | WS for All Tests (Scheme1300A) | Average WS | Variance WS | WS for All Tests (Scheme1300B) | Average WS | Variance WS |
|---|---|---|---|---|---|---|
| 2 | 1.0 | 0.75 | 0.0625 | 0.6284 | 0.0522 | 0.0007 |
| 4 | 1.0 | 0.5 | 0.0938 | 0.4112 | 0.2771 | 0.0010 |
| 8 | 1.0 | 0.3125 | 0.0820 | 0.352 | 0.1510 | 0.0014 |

TABLE 2

| Cores | M for All Tests (Scheme1300A) | Average M | Variance M | M for All Tests (Scheme1300B) | Average M | Variance M |
|---|---|---|---|---|---|---|
| 2 | 10000 | 5000.5 | 24995000.25 | 513 | 14.908 | 879.93 |
| 4 | 10000 | 2500.75 | 18746250.19 | 259 | 7.839 | 298.37 |
| 8 | 10000 | 1250.88 | 10935312.61 | 513 | 5.96 | 549.90 |

Table1 and Table2 demonstrate that the scheme 1300B has reduced the worst FTL share (WS) and the maximum number (M) of consecutive LBAs processed by some FTL, compared with the scheme 1300A. As such, the workload distribution scheme 1300B preserves all advantages of modulo-based workload distribution scheme 1300A and has advantages in terms of the worst FTL share (WS) and the maximum number (M) of consecutive LBAs processed by a particular FTL. In other words, the scheme 1300B has an advantage in terms of performance, compared with the scheme 1300A.

As described above, embodiments provide workload distribution schemes capable of calculating LBA_local and FTL_index simply and fast based on a modulo and shuffling. Further, embodiments calculate the original logical addresses LBA from LBA_local and FTL_index. Especially, the workload distribution scheme based on modulo and shuffling described above has advantages of a modulo-based workload distribution scheme but also balances workloads without a significant performance drop.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A method for operating a memory system which includes a memory device including a plurality of blocks, each block having a physical address corresponding to one of a plurality of logical addresses and a controller including a plurality of cores for controlling the memory device to perform an operation on at least one of the plurality of blocks, the method comprising:
   receiving the plurality of logical addresses from a host;
   determining a range of logical addresses among the plurality of logical addresses to be allocated for the plurality of cores, the range including multiple subsets; and
   distributing the multiple subsets to the plurality of cores, based on an operation of modulo and internal shuffling of the plurality of logical addresses between the plurality of cores,
   wherein the distributing the multiple subsets to the plurality of cores load balances a workload across the plurality of cores by a host interface layer of a first core a) receiving the plurality of logical addresses from the host and b) distributing the plurality of logical addresses between the first core and remaining cores of the plurality of cores.

2. The method of claim 1, wherein the host interface layer of the first core of the plurality of cores which received the plurality of logical addresses from the host, performs the determining and the distributing.

3. The method of claim 1, wherein the determining of the range of logical addresses comprises determining the range based on the plurality of logical addresses and the number of the plurality of cores.

4. The method of claim 1, wherein the distributing of the multiple subsets is based on a Thue-Morse sequence.

5. The method of claim 1, wherein the distributing of the multiple subsets comprises:
   performing a bitwise exclusive (XOR) operation on bits of the plurality of logical addresses; and
   distributing a first subset in the range to a core of the plurality of cores corresponding to the bitwise XOR operation.

6. The method of claim 5, further comprising calculating the plurality of logical addresses based on bits of the range, the distribution result and the number of the plurality of cores.

7. The method of claim 1, further comprising performing the operation on blocks among the plurality of blocks having physical addresses corresponding to the range of the logical addresses allocated to the plurality of cores.

8. A memory system comprising:
   a memory device including a plurality of blocks, each block having a physical address corresponding to one of a plurality of logical addresses; and
   a controller including a plurality of cores for controlling the memory device to perform an operation on at least one of the plurality of blocks, the controller suitable for:
   receiving the plurality of logical addresses from a host;
   determining a range of logical addresses among the plurality of logical addresses to be allocated for the plurality of cores, the range including multiple subsets; and
   distributing the multiple subsets to the plurality of cores, based on an operation of modulo and internal shuffling of the plurality of logical addresses between the plurality of cores,
   wherein the distributing the multiple subsets to the plurality of cores load balances a workload across the plurality of cores by a host interface layer of a first core a) receiving the plurality of logical addresses from the host and b) distributing the plurality of logical addresses between the first core and remaining cores of the plurality of cores.

9. The memory system of claim 8, wherein the host interface layer, of the first core of the plurality of cores which received the plurality of logical addresses from the host, performs the determining and the distributing.

10. The memory system of claim 8, wherein the controller determines the range based on the plurality of logical addresses and the number of the plurality of cores.

11. The memory system of claim 8, wherein the controller distributes the multiple subsets based on a Thue-Morse sequence.

12. The memory system of claim 8, wherein the controller performs a bitwise exclusive OR (XOR) operation on bits of the plurality of logical addresses and distributes a first subset in the range to a core of the plurality of cores corresponding to the bitwise XOR operation.

13. The memory system of claim 12, wherein the controller further calculates the plurality of logical addresses based on bits of the range, the distribution result and the number of the plurality of cores.

14. The memory system of claim 8, wherein the controller further performs the operation on blocks among the plurality of blocks having physical addresses corresponding to the range of the logical addresses allocated to the plurality of cores.

* * * * *